United States Patent
Galles et al.

(10) Patent No.: US 9,019,978 B2
(45) Date of Patent: Apr. 28, 2015

(54) PORT MIRRORING AT A NETWORK INTERFACE DEVICE

(71) Applicant: Cisco Technology, Inc., San Jose, CA (US)

(72) Inventors: Michael B. Galles, Los Altos, CA (US); Cesare Cantu, Santa Clara, CA (US); Anant Deepak, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 294 days.

(21) Appl. No.: 13/645,806

(22) Filed: Oct. 5, 2012

(65) Prior Publication Data

US 2014/0098822 A1    Apr. 10, 2014

(51) Int. Cl.
*H04L 12/28* (2006.01)
*H04L 12/931* (2013.01)

(52) U.S. Cl.
CPC .................................. *H04L 49/208* (2013.01)

(58) Field of Classification Search
CPC ......... H04L 43/50; H04L 43/00; H04L 43/02; H04L 43/022; H04L 43/028; H04L 43/04; H04L 12/54; H04L 12/56; H04L 49/90; H04L 49/901
USPC ......... 370/241, 242, 244, 250, 252, 351, 389, 370/412
See application file for complete search history.

(56) References Cited

U.S. PATENT DOCUMENTS

| | | | | |
|---|---|---|---|---|
| 6,041,042 | A * | 3/2000 | Bussiere | 370/245 |
| 6,760,434 | B1 * | 7/2004 | Rezvani et al. | 379/402 |
| 7,782,784 | B2 | 8/2010 | Agrawal et al. | |
| 8,170,025 | B2 * | 5/2012 | Kloth et al. | 370/392 |
| 8,279,018 | B1 * | 10/2012 | Song et al. | 333/25 |
| 2007/0208838 | A1 | 9/2007 | Balasubramaniam Chandra | 709/223 |
| 2012/0188917 | A1 * | 7/2012 | Knox | 370/277 |
| 2012/0207177 | A1 | 8/2012 | Sharma et al. | |
| 2012/0262217 | A1 * | 10/2012 | Gorbachov et al. | 327/382 |
| 2014/0050124 | A1 * | 2/2014 | Yang et al. | 370/278 |

* cited by examiner

*Primary Examiner* — Chi H Pham
*Assistant Examiner* — Weibin Huang
(74) *Attorney, Agent, or Firm* — Edell, Shapiro & Finnan, LLC

(57) ABSTRACT

A notification from a source host is received at a network interface device that indicates that a data packet is ready for transmission to a destination host. The data packet may be transmitted to the destination host via the network interface device, and a first completion queue event is generated. The first completion queue event may be used as a trigger to re-transmit the data packet to a port mirroring destination via the network interface device. In another example, a network interface device receives a data packet transmitted from a source host to a destination host. A first completion queue event is generated based on the receipt of the packet, and is used as a trigger to re-transmit the data packet to a port mirroring destination via the network interface device.

31 Claims, 7 Drawing Sheets

PORT MIRRORING AT A NETWORK INTERFACE DEVICE

TECHNICAL FIELD

The present disclosure relates to port mirroring in a computer network.

BACKGROUND

In a computer network, data is transmitted from a source host to a destination host in the form of packets that generally pass through one or more networking devices (e.g., switches, routers, firewalls, etc.). During the transmission, certain errors may arise that result in, for example, redundant data being added to the original data, dropped packets, etc. Port mirroring is a feature that is currently provided on networking devices that may be used to detect, diagnose, and/or debug such errors.

In conventional port mirroring techniques, a networking device replicates an incoming and/or outgoing packet, and forwards the replicated packet to a network analyzer. The network analyzer is typically attached to a specific port of the networking device that performs the port mirroring.

DESCRIPTION OF EXAMPLE EMBODIMENTS

Overview

Figure 1:
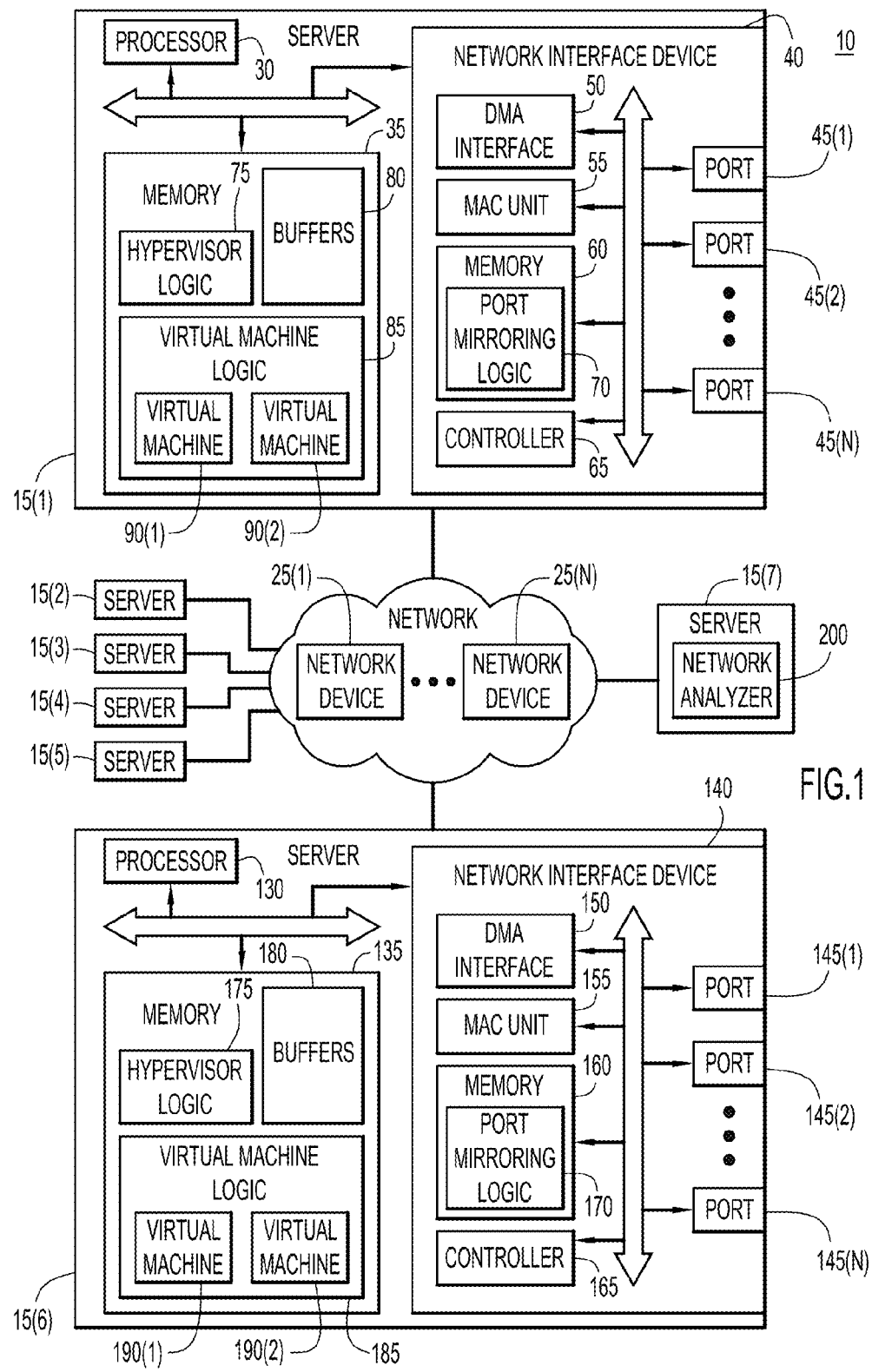
FIG. 1 is a block diagram of a data center in which network interface port mirroring techniques may be performed.

Techniques are provided herein for performing port mirroring during egress or ingress of a packet from a network interface device. In one example, a network interface device receives a notification from a source host indicating that a data packet is ready for transmission to a destination host. The data packet may be transmitted to the destination host via the network interface device and a first completion queue event is generated. The first completion queue event may be used to trigger a re-transmission of the data packet to a port mirroring destination via the network interface device. In another example, a network interface device receives a data packet transmitted from a source host to a destination host. A first completion queue event is generated based on the receipt of the data packet, and this event is used to trigger a transmission of the data packet to a port mirroring destination via the network interface device. In both cases a completion event resulting from the second transmission (to the port mirroring destination) can be presented to the host as completion of the first event (which is the interesting event for the host).

Example Embodiments

Port mirroring is a feature provided by networking devices (e.g., hubs, switches, routers, etc.) that primarily forward packets (i.e., intermediate devices in the network that are not generally the consumers or producers of packets). In a computing network such as a data center, the networking devices may be connected to a large number of hosts (e.g., servers, computers, etc.) such that, when data traffic reaches a networking device configured to perform port mirroring, the mirrored traffic may be aggregated across a plurality of hosts. For example, a data center may include multiple physical servers that each hosts one or more virtual machines. In such an arrangement, the networking devices may forward traffic that originates from hundreds or thousands of different virtual machines. As such, when the traffic from the different virtual machines reaches a networking device which has port mirroring capabilities, a single port on the networking device can represent traffic from a large number of virtual machines. Because conventional port mirroring is performed at the port level, all of the traffic on a subject port (potentially from hundreds or thousands of virtual machines) will be copied and transmitted to the network analyzer. Accordingly, there is generally no way to distinguish the traffic from each of the different virtual machines.

In addition to the above issues, port mirroring on networking devices generally uses dedicated silicon technology for packet replication, thereby increasing manufacturing costs. There is also the possibility that, by the time traffic reaches the networking device which has the port mirroring capabilities, some traffic could be dropped (partially or fully) or the packets may be modified as a result of, for example, network address translation (NAT), access control settings, networking features, etc. The networking device is unable to mirror dropped packets to the network analyzer and/or mirrors modified packets that do not properly represent the traffic that was transmitted by a source host.

Presented herein are techniques for performing port mirroring at a network interface device of a host upon ingress and/or egress of a data packet to/from the network interface device. In certain examples, these network interface port mirroring techniques allow for packet mirroring at the host level, rather than at a port level. This enables the differentiation of the packets from different hosts at the network analyzer. Compared to other schemes, the one presented herein mirrors packets very close to the host network interface which sent the original packets or which is going to receive the original packets. Additionally, the network interface port mirroring techniques may be performed without any dependency or interaction with the host such that the network interface device can represent, for example, a bare metal server, a virtual machine interface over a hypervisor using passthrough or direct device assignment technology, or upstream ports of hypervisor switches. For example, there is no change required in host components such as the network interface device driver or the virtual switch. On the egress side, the network interface port mirroring techniques may also be less susceptible to dropped or modified packet issues than conventional packet mirroring techniques performed at an intermediate networking device. As described further below, the network interface port mirroring techniques may be executed without introducing significant overhead or new primitives to the network interface device operation and without dedicated silicon technology for packet replication.

In contrast to conventional port mirroring solutions (provided by intermediate devices in the network), the techniques presented herein are performed at devices which operate at the end of a network (packet producers and consumers) which is typically a host machine or server transmitting/receiving and/or processing the data of a packet. This makes the presented techniques innovative and scalable by implementation at the initial transmission of a packet (source) or the final destination of a packet (destination) and not at intermediate devices in the network.

FIG. 1 is a block diagram of an example data center 10 in which network interface port mirroring techniques may be performed. Data center 10 comprises servers 15(1), 15(2), 15(3), 15(4), 15(5), 15(6), and 15(7) connected by a network 20. Network 20 may be, for example, a local area network (LAN) or a wide area network (WAN), and comprises a plurality of networking devices 25(1)-25(N). Networking devices 25(1)-25(N) may comprise switches, routers, firewalls, load balancers, etc.

The servers 15(1)-15(7) use network 20 to exchange data in the form of data packets. For ease of illustration, the network interface port mirroring techniques will be described with reference to the transmission of traffic (i.e., one or more data packets) from server 15(1) to server 15(6). The details of only servers 15(1) and 15(6) are shown in FIG. 1.

Server 15(1) comprises a processor 30, a memory 35, and a network interface device 40. Network interface device 40, sometimes referred to as a network interface card (NIC), comprises a plurality of ports 45(1)-45(N), a direct memory access (DMA) interface 50, a media access control (MAC) unit 55, a memory 60, and a controller 65. Memory 60 includes port mirroring logic 70.

Memory 35 comprises hypervisor logic 75, buffers 80, and virtual machine logic 80 for virtual machines (VMs) 90(1) and 90(2). Memory 35 may comprise read only memory (ROM), random access memory (RAM), magnetic disk storage media devices, optical storage media devices, flash memory devices, electrical, optical, or other physical/tangible memory storage devices. The processor 30 is, for example, a microprocessor or microcontroller that executes instructions for the hypervisor logic 75 and virtual machine logic 85. Thus, in general, the memory 35 may comprise one or more tangible (non-transitory) computer readable storage media (e.g., a memory device) encoded with software comprising computer executable instructions and when the software is executed (by the processor 30) it is operable to perform the operations described herein in connection with hypervisor logic 75 and virtual machine logic 85.

The hypervisor logic 75, sometimes referred to as a virtual machine manager, is a program that allows multiple operating systems to share a single physical host-computing device. Each operating system appears to have exclusive use of the host's processor, memory, and other resources. However, the hypervisor actually controls the host processor and resources, allocates what is needed by each operating system, and ensures that all of the operating systems cannot disrupt one another. Hypervisor logic 75, when executed, allows the operating systems of virtual machines 90(1) and 90(2) to share the resources of server 15(1). For example, as described further below, the virtual machines 90(1) and 90(2) may access and use buffers 80.

The memory 60 may comprise ROM, RAM, magnetic disk storage media devices, optical storage media devices, flash memory devices, electrical, optical, or other physical/tangible memory storage devices. The controller 65 may comprise one or more Application Specific Integrated Circuits (ASICs), a microprocessor or a microcontroller that executes software instructions in memory 60, such as port mirroring logic 70. Thus, in general, the memory 60 may comprise one or more tangible (non-transitory) computer readable storage media (e.g., a memory device) encoded with software comprising computer executable instructions and when the software is executed (by the processor) it is operable to perform the operations described herein in connection with the port mirroring techniques (through execution of port mirroring logic 70).

Server 15(6) is arranged substantially the same as server 15(1) and comprises a processor 130, a memory 135, and a network interface device 140. Network interface device 140, sometimes referred to as a NIC, comprises a plurality of ports 145(1)-145(N), a DMA interface 150, a MAC unit 155, a memory 160, and a control module 165. Control module 165 includes a port mirroring sub-module 170. Memory 135 comprises hypervisor logic 175, buffers 180, and virtual machine logic 185 for virtual machines 190(1) and 190(2).

Memory 135 comprises hypervisor logic 175, buffers 180, and virtual machine logic 180 for virtual machines (VMs) 190(1) and 190(2). Memory 135 may comprise ROM, random RAM, magnetic disk storage media devices, optical storage media devices, flash memory devices, electrical, optical, or other physical/tangible memory storage devices. The processor 130 is, for example, a microprocessor or microcontroller that executes instructions for the hypervisor logic 175 and virtual machine logic 185. Thus, in general, the memory 135 may comprise one or more tangible (non-transitory) computer readable storage media (e.g., a memory device) encoded with software comprising computer executable instructions and when the software is executed (by the processor 130) it is operable to perform the operations described herein in connection with hypervisor logic 175 and virtual machine logic 185.

The hypervisor logic 175, sometimes referred to as a virtual machine manager, is a program that allows multiple operating systems to share a single physical host-computing device. Each operating system appears to have exclusive use of the host's processor, memory, and other resources. However, the hypervisor actually controls the host processor and resources, allocates what is needed by each operating system, and ensures that all of the operating systems cannot disrupt one another. Hypervisor logic 175, when executed, allows the operating systems of virtual machines 190(1) and 190(2) to share the resources of server 15(6). For example, as described further below, the virtual machines 190(1) and 190(2) may access and use buffers 180.

Like memory 60, the memory 160 may comprise ROM, RAM, magnetic disk storage media devices, optical storage media devices, flash memory devices, electrical, optical, or other physical/tangible memory storage devices. The controller 165 may comprise one or more ASICs, a microprocessor or a microcontroller that executes software instructions in memory 160, such as port mirroring logic 170. Thus, in general, the memory 160 may comprise one or more tangible (non-transitory) computer readable storage media (e.g., a memory device) encoded with software comprising computer executable instructions and when the software is executed (by the processor) it is operable to perform the operations described herein in connection with the port mirroring techniques (through execution of port mirroring logic 170).

In the example of FIG. 1, network interface devices 40 and 140 are each programmable NICs and the controllers 65 and 165 each comprise one or more programmable processors that run compiled-code firmware. The DMA interfaces 50 and 150 are controlled by the onboard control modules 65 and 165, respectively, to read and write data between the local NIC memories 60 and 165 and the memories 35 and 135 of servers 15(1) and 15(6), respectively. The MAC units 55 and 155 interact with the controllers 65 and 165, respectively, and DMA interface 50 and 150, respectively, to receive frames into buffers 80 and 180, respectively, and to send frames from buffers 80 and 180, respectively, out onto the network 20. The memories 60 and 160 may each be used for temporary storage of frames, descriptors, and other control data. In accordance with specific examples presented herein, the memories 60 and 160 are used to store the additional descriptors only. The frames (packets) themselves are not copied to local memories 60/160. Rather, in the case of packet transmission, the packet is sent from host memory 35 out on the wire. Similarly, in the case of packet reception, the packet is placed in host memory 135 from the wire.

In operation, a virtual machine 90(1) executed on server 15(1) transmits data packets to virtual machine 190(2) on server 15(6). In other words, virtual machine 90(1) is a source host or a stream of data packets, while virtual machine 190(2) is a destination host for the stream of data packets. The illustration of virtual machines as source/destination hosts is merely one example, and it is to be appreciated that the network interface port mirroring techniques may be executed with servers that operate as source/destinations without virtualization (i.e., examples where there are no virtual machines or virtualization capabilities on the servers 15(1)-15(7)).

In one example of FIG. 1, when packets are transmitted via network interface device 40, the network interface device 40 is configured to perform port mirroring operations such that a copy of each of the transmitted packets is sent to a port mirroring destination, shown as network analyzer 200 on server 15(7). This egress port mirroring capability is represented in FIG. 1 by port mirroring sub-module 70. At the same time, or separately, network interface device 140 is configured to perform port mirroring operations such that a copy of each of the received packets is sent to the network analyzer 200 on server 15(7). This ingress port mirroring capability is represented in FIG. 1 by port mirroring sub-module 170.

The port mirroring logic 70 and 170 represent specific configurations of network interface devices 40 and 140, respectively, in which the network interface devices are arranged to perform port mirroring operations. Although the port mirroring logic 70 and 170 are shown as part of memories 60 and 160, respectively, it is to be appreciated that certain port mirroring operations may be performed by control logic (controllers 65 and 165). For example, as described below, using a completion event to trigger a re-transmission for port mirroring can be attributed as controller logic.

The network interface devices 40 and 140 may be managed via in-band control plane packets or via a dedicated control plane interface on the network interface devices. These techniques may be used such that special control plane packets carry configuration messages which are received and processed by the network interface devices 40 and 140. These control packets are then used to setup or configure one or more of the components of the network interface devices 40 and 140 (e.g., controllers 65 and 165, respectively, port mirroring logic 70 or 170, respectively, MAC units 55 and 155, respectively, or DMA interfaces 50 and 155, respectively) to perform the port mirroring operations described herein. The source of these control packets may be, for example, a controller node (e.g., a network switch, a specialized network controller, the network analyzer 200, etc.) in the network 20 which accepts operator configurations. To enable the port mirroring functionality at network interface devices 40 and 140, the control packets may include an identity of a port or a host (e.g., virtual machine) for which the port mirroring should be activated and/or data for the port mirroring destination (e.g., the Internet Protocol (IP) address for the port mirroring destination, the MAC address for the port mirroring destination, etc.). In certain examples, the network interface port mirroring capabilities of network interface devices 40 and 140 are transparent to the hosts. In other words, the virtual machines 90(1), 90(2), 190(1), and 190(2), and control planes of servers 15(1) and 15(6) in general are unaware of the port mirroring at network interface devices 40 and 140 and may not be able to detect when such port mirroring is in operation.

FIG. 1 illustrates merely one example arrangement for network interface devices 40 and 140 and for servers 15(1) and 15(6) in general. In particular, FIG. 1 illustrates the network interface port mirroring techniques with reference to network interface devices configured to use direct memory access to transfer data. It is to be appreciated that network interface devices may take many forms and may use different techniques to transfer data (e.g., polling, interrupt-driven I/O, etc.). The network interface port mirroring techniques may be executed in network interface devices using these or other data transfer techniques. It is also to be appreciated that network interface device 40 may be configured to perform ingress port mirroring operations if hosting or operating as a destination, while network interface device 140 may be configured to perform egress port mirroring operations if hosting or operating as a source. Similarly, servers 15(2)-15(5) may also be configured to perform ingress and/or egress network interface port mirroring operations.

It is to be appreciated that the network interface devices 40 and 140 may each operate with multiple host interfaces (e.g., any combination of virtual interfaces and/or physical interfaces), some or all of which may participate in the port mirroring. In certain examples, the techniques may be used to mirror a single virtual host interface among many such interfaces. Furthermore, the techniques presented herein may also apply to devices that include multiple physical host interfaces as well as multiple virtual host interfaces attached to a single physical host interface. The port mirroring scheme presented herein can select any subset of virtual or physical host interfaces to mirror.

Figure 2:
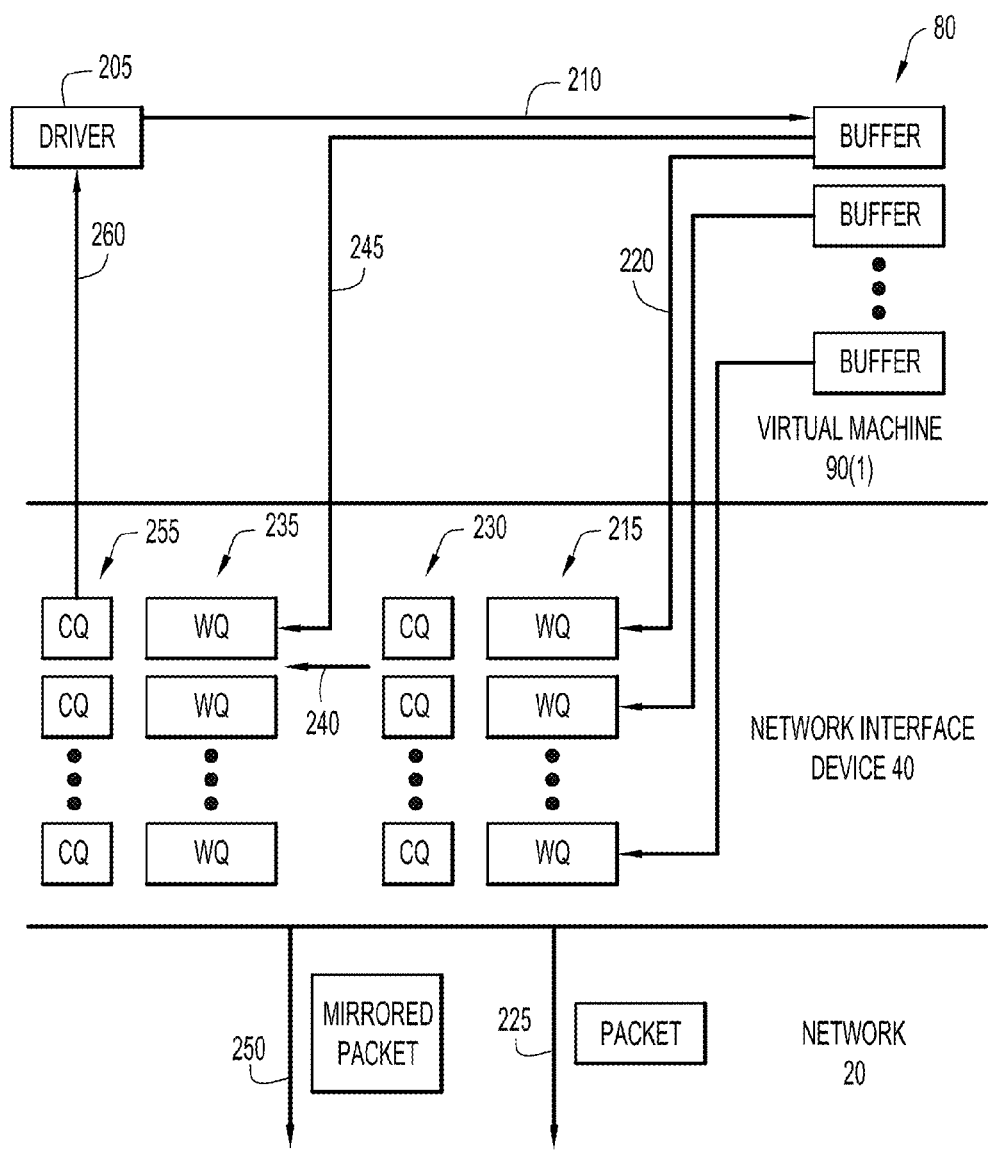
FIG. 2 is block diagram illustrating components of a network interface device configured to perform egress network interface port mirroring operations.
Figure 3:
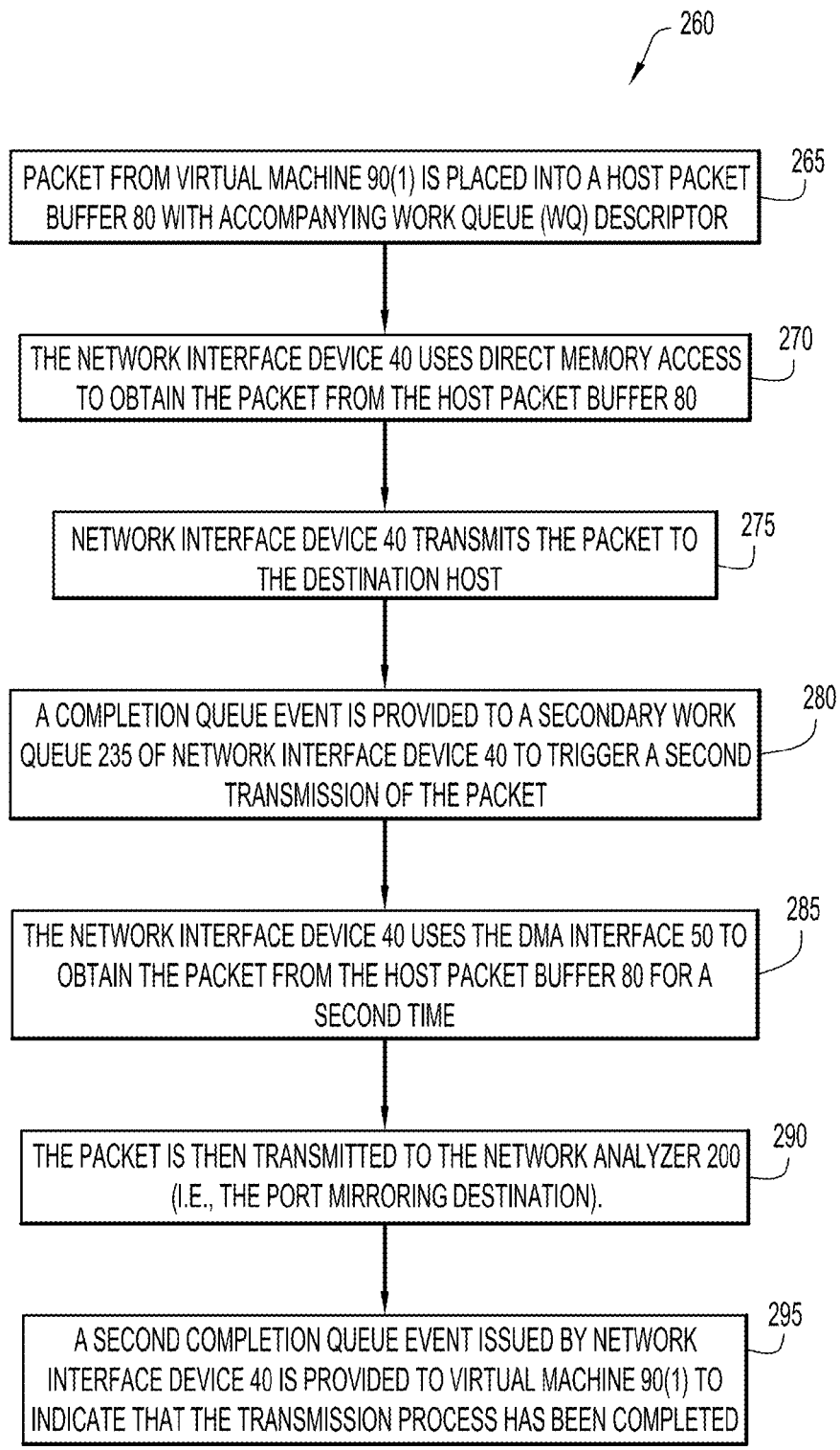
FIG. 3 is a flowchart illustrating egress network interface port mirroring techniques.

FIG. 2 is a block diagram of network interface device 40 configured to perform transmit or egress port mirroring operations. FIG. 3 is a flowchart of a method 260 performed by network interface device 40 during the egress port mirroring operations. For ease of description, method 260 will be described with reference to the block diagram of FIG. 2.

Method 260 begins at 265 where a data packet from the virtual machine 90(1) (i.e., the source host) is placed into a buffer 80 with an accompanying work queue (WQ) descriptor. This operation is shown in FIG. 2 by arrow 210 and may be performed, for example, by a host driver 205 of virtual machine 90(1). A notification may be provided to network interface device 40 that the data packet has been added to the buffer and is ready for transmission. In this example, the network interface device 40 includes a first work queue 215, a first completion queue 230, a secondary work queue 235, and a secondary completion queue 255.

At 270, the network interface device 40 is configured to use the DMA interface 50 to obtain the packet from the buffer 80. This operation is shown in FIG. 2 by arrow 220. The host (virtual machine 90(1)) and the network interface device 40 share the descriptors (WQ and RQ) which describe the location of the buffers 80 in host memory 35. Once the network interface device 40 is aware that a buffer 80 is available for transmission, the network interface DMA's the packet from the host buffer 80 and then sends the out on the wire. During this time, the packet may be in the network interface device silicon, but does not really exist in the traditional memory 60 of the device (i.e., the packet in memory 35 is not added to memory 60).

When the DMA interface 50 obtains the packet from the buffer 80, the buffer 80 is locked from the perspective of virtual machine 90(1). That is, the host is prevented from using or modifying the data in the buffer 80 until it receives a release message from the network interface device 40.

After obtaining the data packet, at 275 the network interface device 40 transmits the data packet to the destination host (e.g., virtual machine 190(2)) via one of the ports 45(1)-45(N). This transmission is shown in FIG. 2 by arrow 225.

Upon transmission of the packet to the destination host, a completion queue (CQ) indication or event is generated and added to the first completion queue 230 in memory 60. In a conventional arrangement, this completion queue event functions as a notification to the host that the transmission is complete and that the source host can re-take control of the buffer 80. However, at 280 of FIG. 3, the network interface device 40 is configured such that the completion queue event is provided to a second work queue 235 of network interface device 40 to trigger a second transmission of the packet. This operation is shown in FIG. 2 by arrow 240. It should be noted that this completion queue event is not provided to virtual machine 90(1) and the virtual machine 90(1) is not aware that the packet has been transmitted to the destination host. As such, the buffer 80 remains locked to the virtual machine 90(1).

After issuance of the completion queue event to the secondary work queue 235, at 285 the network interface device 40 uses the DMA interface 50 to obtain the packet from the buffer 80 for a second time. This operation is shown in FIG. 2 by arrow 245. As noted above, the packet is processed in the network interface device silicon (not stored in memory 60) and transmitted out on the wire.

At 290, the packet is then transmitted to the network analyzer 200 (i.e., the port mirroring destination). This transmission of the mirrored packet to the port mirroring destination is shown in FIG. 2 by arrow 250.

As noted, the mirrored packet goes to a different destination (i.e., the network analyzer 200) even though the packet is a mirror of the original packet. This is done because the transmission event is a property of the network interface card 40 and a secondary WQ exclusively setup for this purpose is always used to do this transmission (i.e., it can be configured so as to do the transmission to the port mirroring destination). This can be done by, for example, performing some form of packet encapsulation of packets going out of the second WQ, physical isolation of the ports (e.g., port isolation bound to the secondary WQ) or any such techniques. Since the secondary WQ doing the re-transmission is setup and managed by the network device, these operations are still possible without host knowledge and intervention.

Upon transmission of the packet to the port mirroring destination, a second completion queue event is generated and added to a second completion queue 255 in memory 60. At 295, this second completion queue event issued by network interface device 40 is provided to virtual machine 90(1) to indicate that the transmission process has been completed. This notification is shown in FIG. 2 by arrow 260. At this point the buffer 80 is released for control by the host. In one example, virtual machine 90(1) is configured to monitor the second completion queue 255 for the completion queue event.

In summary of the example of FIGS. 2 and 3, once a transmission of a data packet to a destination host via network interface device 40 is complete, a first generated completion queue event is used to trigger another egress of the packet to the port mirroring destination resulting in a second completion queue event. The first completion queue event is not reported to the source host, but rather is internally used to trigger the second transmission (i.e., only the second completion queue event is reported to the source host). Therefore, the source host is only aware of one transmission of the data packet.

Figure 4:
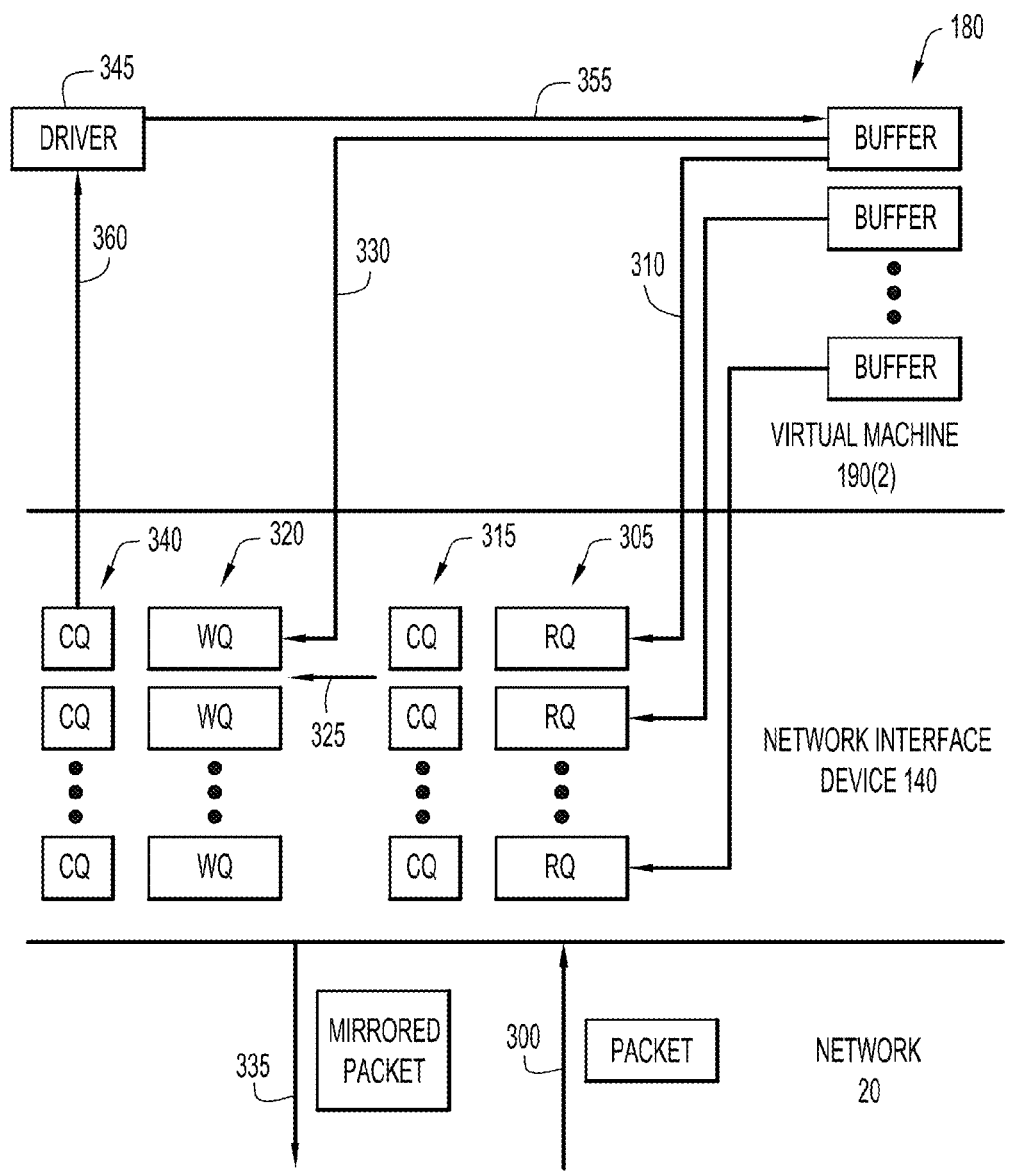
FIG. 4 is block diagram illustrating components of a network interface device configured to perform ingress network interface port mirroring operations.
Figure 5:
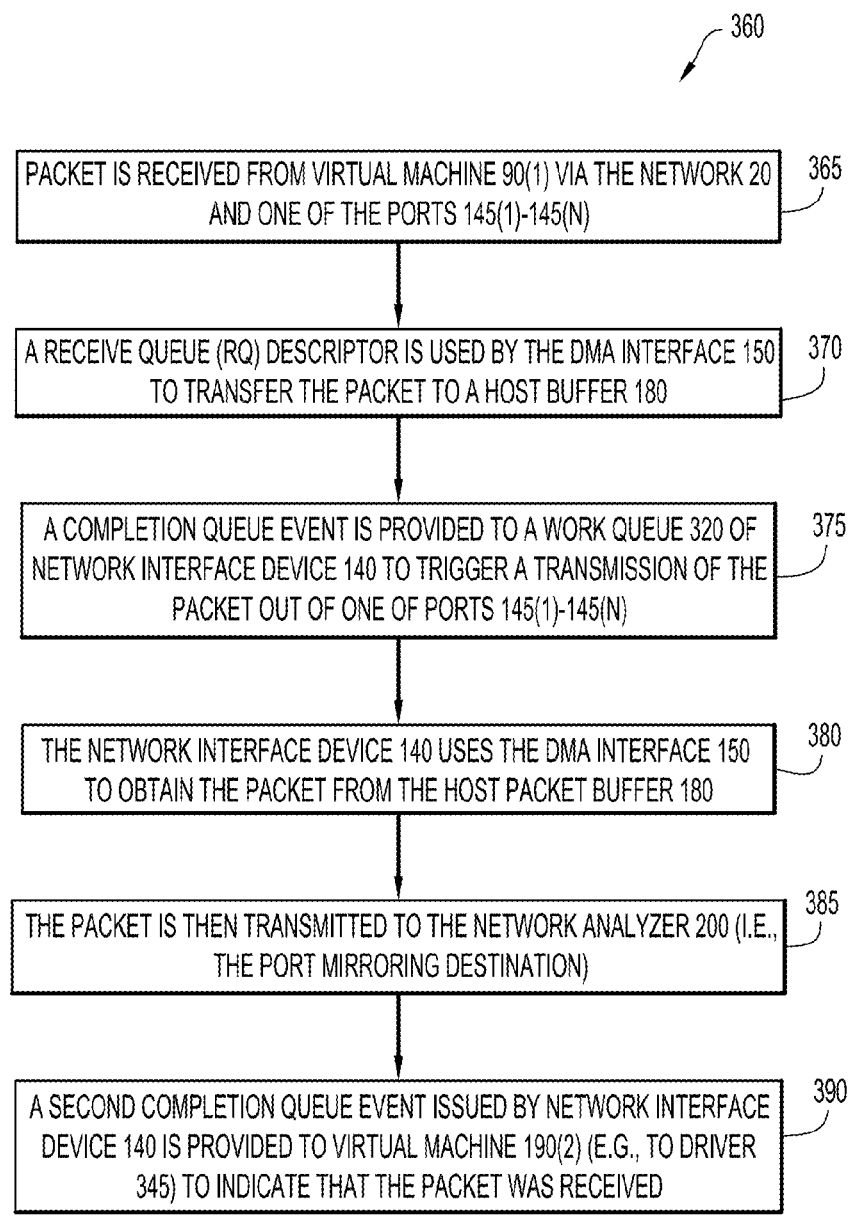
FIG. 5 is a flowchart illustrating ingress network interface port mirroring techniques.

FIG. 4 is a block diagram of network interface device 140 configured to perform receive or ingress port mirroring operations. FIG. 5 is a flowchart of the method 360 performed by network interface device 140 during the ingress port mirroring operations of FIG. 4. For ease of description, method 360 will be described with reference to the block diagram of FIG. 4.

Method 360 begins at 365 where a packet is received from virtual machine 90(1) (i.e., a source device) via the network 20 and one of the ports 145(1)-145(N). The receipt of this packet is shown by arrow 300 in FIG. 4. At 370, a receive queue (RQ) descriptor is used by the DMA interface 150 to transfer the packet to a buffer 180. In other words, the network interface device 140 uses a direct memory access operation to place the packet in a buffer 180 of memory 135. This operation is shown in FIG. 4 by arrow 310. The RQ descriptor is pre-prepared by the host with a host side buffer so that the network interface device can land a packet in the buffer. The network interface device 140 identifies the RQ and then reads the next available descriptor in queue to determine the destination host memory to DMA the packet. The driver 345 pre-provisions the host address inside the RQ descriptor.

When the DMA interface 50 places the packet into a buffer 180, the buffer is locked from the perspective of virtual machine 190(2). That is, the destination host is prevented from using the buffer 180 until it receives a release message from the network interface device 140.

Upon placement of the packet into host buffer 180, a completion queue indication or event is generated and added to a completion queue 315 in memory 160. In a conventional arrangement, this completion queue event operates as a notification to the destination host that a data packet has been received, added to the buffer 180, and that the virtual machine 190(2) can take control of the buffer 180 and process the data packet. However, in the network interface port mirroring techniques of FIGS. 4 and 5, at 375, the network interface device 140 is configured such that the completion queue event is provided to a work queue 320 of network interface device 140 to trigger a transmission of the received data packet out of one of ports 145(1)-145(N). This operation is shown in FIG. 4 by arrow 325. However, this completion queue event is not provided to virtual machine 190(2) and the virtual machine 190(2) is not aware that the packet has been received from the source host. As such, the buffer 180 remains locked to the virtual machine 190(2).

After issuance of the completion queue event to the work queue 320, at 380 the network interface device 140 uses the DMA interface 150 to obtain the packet from the buffer 180. This operation is shown in FIG. 4 by arrow 330.

At 385, the packet is then transmitted to the network analyzer 200 (i.e., the port mirroring destination). This transmission of the mirrored packet to the port mirroring destination is shown in FIG. 4 by arrow 335. At 390, upon transmission of the packet to the port mirroring destination, a second completion queue event is generated and provided to virtual machine 190(2) (e.g., to driver 345) to indicate that a data packet was received and added to the buffer 180. (i.e., although triggered by a transmission processes, the destination host interprets this event as a notification to retrieve a data packet from buffer 180). This notification is shown in FIG. 4 by arrow 350. In one example, the second completion queue event may be added to a second completion queue that is monitored by driver 345. As a result of the second completion queue event, the buffer 180 is released for control by virtual machine 190(2) and the virtual machine may retrieve the packet from buffer 180 and process the packet. This retrieval process is shown by arrow 355 in FIG. 4.

In summary of the example of FIGS. 4 and 5, once a data packet is received at network interface device 140, a first generated completion queue event is used to trigger an egress of the packet to the port mirroring destination resulting in a second completion queue event. The first completion queue event is not reported to the destination host, but rather is internally used to trigger the secondary transmission (i.e., only the second completion queue event is reported to the destination device). Therefore, the destination device is only aware of receipt of the data packet.

Figure 6:
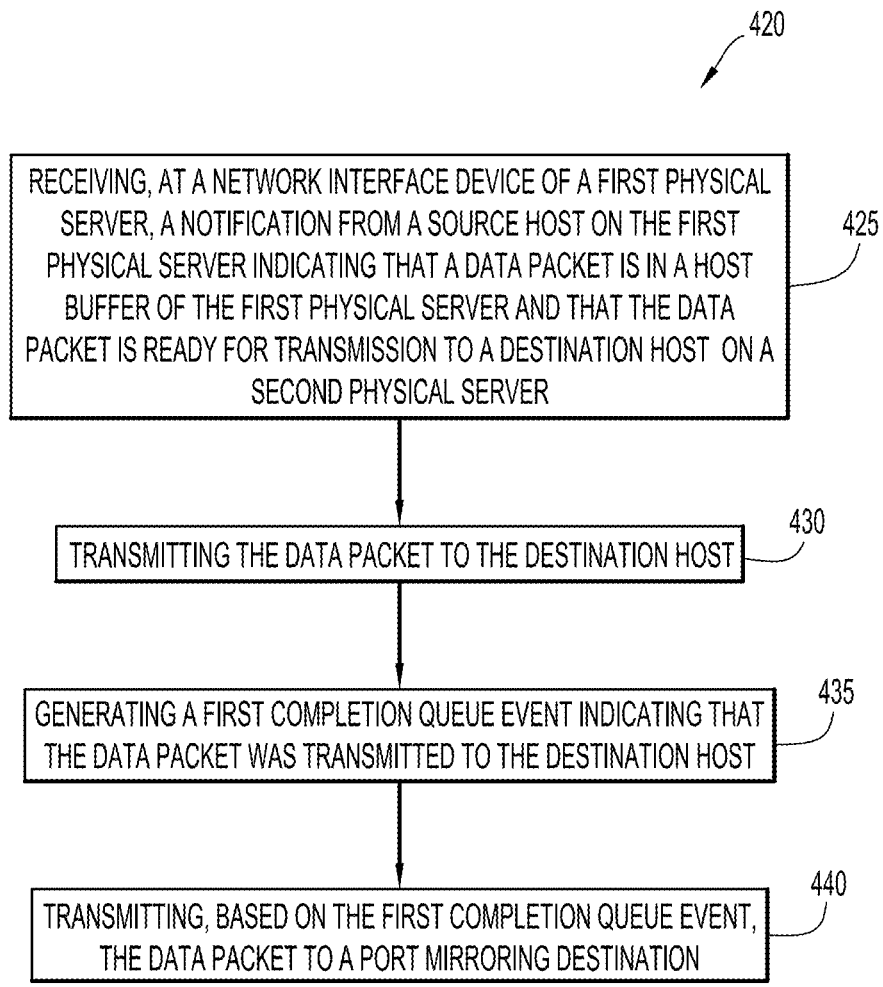
FIG. 6 is a high-level flowchart illustrating egress network interface port mirroring techniques.

FIG. 6 is a high-level flowchart illustrating a method 420 for egress network interface port mirroring techniques. Method 420 begins at 425 where a notification from a source host on a first physical server is received at a network interface device of the first physical server. The notification indicates that a data packet is in a host buffer of the physical server and that the data packet is ready for transmission to a destination host on a second physical server. At 430, the data packet is transmitted to the destination host and, at 435, a first completion queue event indicating that the data packet was transmitted to the destination host is generated. At 440, the data packet is transmitted, based on the first completion queue event, to a port mirroring destination.

In one example, the first completion queue event is prevented (blocked) from reaching the source host so that the host buffer remains temporarily locked to the source host after transmission of the data packet. A second completion queue event may be generated after transmission of the data packet to the port mirroring destination, and this second completion queue event may be forwarded to the source host so that the host buffer is unlocked to the source host.

In this example, the first completion queue event is consumed internally in the network interface device to trigger the transmission of the packet to the port mirroring destination. The transmission completion of this transmission (second event) is a second completion event (for the same packet) which is indicated to the virtual machine/host as completion of the initial transmission out to the network (the virtual machine/host only cares and perhaps is aware of the first transmission, not the second)

Figure 7:
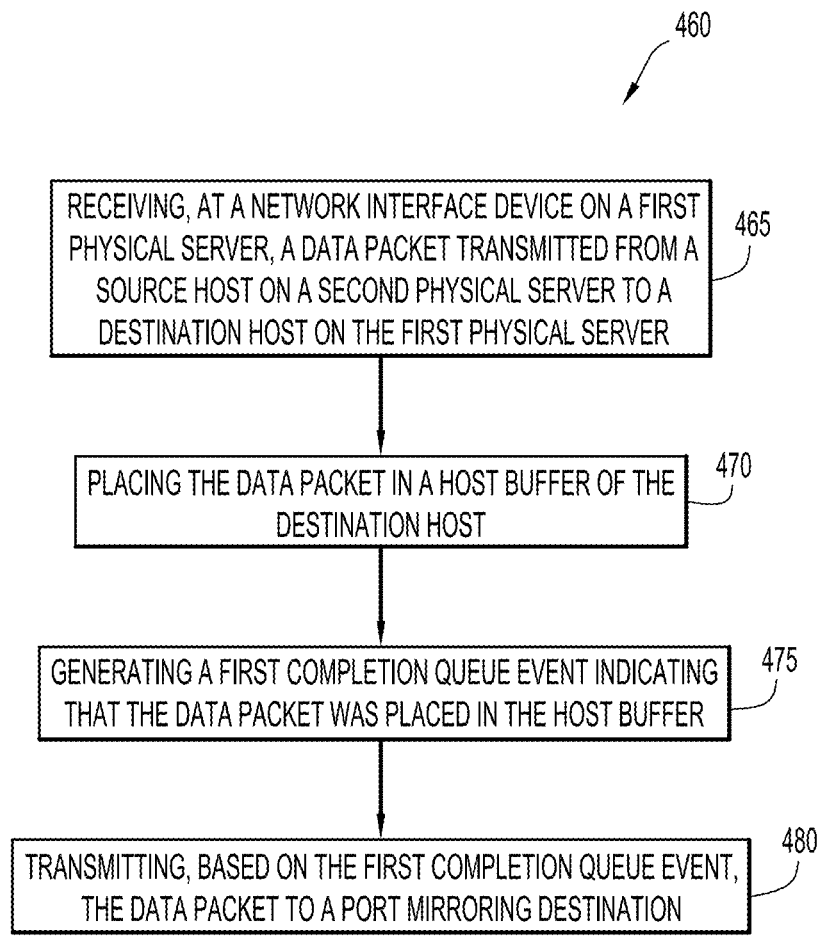
FIG. 7 is a high-level flowchart illustrating ingress network interface port mirroring techniques.

FIG. 7 is a high-level flowchart illustrating a method 460 for ingress network interface port mirroring techniques. Method 460 begins at 465 where a network interface device on a physical server receives a data packet transmitted from a source host on a second physical server to a destination host on the first physical server. At 470, the data packet is placed into a host buffer of the destination host. At 475, a first completion queue event indicating that the data packet was placed in the host buffer is generated. At 480, the data packet is transmitted, based on the first completion queue event, to a port mirroring destination.

In one example, the first completion queue event is prevented (blocked) from reaching the destination host so that the host buffer remains temporarily locked to the destination host after receipt of the data packet. A second completion queue event may be generated after transmission of the data packet to the port mirroring destination, and this second completion queue event may be forwarded to the destination host so that the host buffer is unlocked to the destination host.

Again, in this example, the first completion event is consumed internally to trigger the transmission of the just received packet to the port mirroring destination. The completion event from this second transmission is then presented to the virtual machine/host as completion of the initial reception of the packet (the virtual machine/host only cares and perhaps should be aware of the first reception of packet, not the transmission)

The network interface port mirroring techniques presented herein provide a scalable and efficient mechanism for mirroring without expensive hardware technology or packet replication schemes at a switch. A network interface device configured as described herein may achieve port mirroring by reusing the primitives for transmitting a data packet from host to the wire.

The above description is intended by way of example only.

What is claimed is:

1. A method comprising:
    receiving, at a network interface device of a first server, a notification from a source host on the first server indicating that a data packet is in a host buffer of the first server and that the data packet is ready for transmission to a destination host on a second server;
    transmitting the data packet to the destination host;
    generating a first completion queue event indicating that the data packet was transmitted to the destination host; and
    transmitting, based on the first completion queue event, the data packet to a port mirroring destination.

2. The method of claim 1, further comprising:
    preventing the first completion queue event from reaching the source host so that the host buffer remains temporarily locked to the source host after transmission of the data packet to the destination host;
    generating a second completion queue event after transmission of the data packet to the port mirroring destination; and
    forwarding the second completion queue event to the source host so that the host buffer is unlocked to the source host.

3. The method of claim 2, wherein the network interface device comprises at least first and second completion queues, and wherein forwarding the second completion queue event to the source host comprises:
    adding the second completion queue event to the second completion queue, wherein the second completion queue is monitored by a host driver of the source host.

4. The method of claim 1, wherein the data packet is associated with a work queue descriptor and wherein transmitting the data packet to the destination host comprises:
    performing, based on the work queue descriptor, a direct memory access operation to retrieve the data packet from the host buffer for use by a primary work queue during transmission of the data packet to the destination host.

5. The method of claim 4, further comprising:
    forwarding the first completion queue event to a secondary work queue; and
    performing a direct memory access operation to re-retrieve the data packet from the host buffer for use by the secondary work queue during transmission of the data packet to the port mirroring destination.

6. The method of claim 1, wherein receiving a notification indicating that a data packet is in a host buffer of a source host comprises:

receiving a notification from a virtual machine executed on the first server indicating that a data packet is ready for transmission from the virtual machine to a destination host.

7. A method comprising:
receiving, at a network interface device on a first server, a data packet transmitted from a source host on a second server to a destination host on the first server;
placing the data packet in a host buffer of the destination host;
generating a first completion queue event indicating that the data packet was placed in the host buffer; and
transmitting, based on the first completion queue event, the data packet to a port mirroring destination.

8. The method of claim 7, further comprising:
preventing the first completion queue event from reaching the destination host so that the host buffer remains temporarily locked to the destination host after receipt of the data packet;
generating a second completion queue event after transmission of the data packet to the port mirroring destination; and
forwarding the second completion queue event to the destination host so that the host buffer is unlocked to the destination host.

9. The method of claim 8, wherein the network interface device comprises at least first and second completion queues, and wherein forwarding the second completion queue event to the destination host comprises:
adding the second completion queue event to the second completion queue, wherein the second completion queue is monitored by a host driver of the destination host.

10. The method of claim 7, wherein placing the data packet in the host buffer of the destination host comprises:
performing a direct memory access operation to place the data packet in the host buffer.

11. The method of claim 7, wherein the network interface card comprises a primary work queue and a secondary work queue and further comprising:
forwarding the first completion queue event to a secondary work queue; and
performing a direct memory access operation to re-retrieve the data packet from the host buffer for use by the secondary work queue during transmission of the data packet to the port mirroring destination.

12. The method of claim 7, wherein receiving a data packet transmitted from a source host on a second server to a destination host on the first server comprises:
receiving a data packet from a virtual machine executed on the second server that is transmitted to a virtual machine executed on the first server.

13. An apparatus comprising:
a plurality of ports;
a memory; and
a controller coupled to the ports and the memory, and configured to:
receive a notification from a source host indicating that a data packet is in a host buffer and that the data packet is ready for transmission to a destination host,
transmit the data packet to the destination host,
generate a first completion queue event indicating that the data packet was transmitted to the destination host, and
transmit, based on the first completion queue event, the data packet to a port mirroring destination.

14. The apparatus of claim 13, wherein the controller is configured to:
prevent the first completion queue event from reaching the source host so that the host buffer remains temporarily locked to the source host after transmission of the data packet to the destination host;
generate a second completion queue event after transmission of the data packet to the port mirroring destination; and
forward the second completion queue event to the source host so that the host buffer is unlocked to the source host.

15. The apparatus of claim 14, wherein the memory comprises at least first and second completion queues, and wherein to forward the second completion queue event to the source host the controller is configured to:
add the second completion queue event to the second completion queue, wherein the second completion queue is monitored by a host driver of the source host.

16. The apparatus of claim 13, wherein the data packet is associated with a work queue descriptor and wherein to transmit the data packet to the destination host, the controller is configured to:
perform, based on the work queue descriptor, a direct memory access operation to retrieve the data packet from the host buffer for use by a primary work queue during transmission of the data packet to the destination host.

17. The apparatus of claim 16, wherein the controller is configured to:
forward the first completion queue event to a secondary work queue; and
perform a direct memory access operation to re-retrieve the data packet from the host buffer for use by the secondary work queue during transmission of the data packet to the port mirroring destination.

18. The apparatus of claim 13, wherein the apparatus operates with multiple host interfaces and the apparatus is configured to transmit data packets to a port mirroring destination for some or all of the multiple host interfaces.

19. The apparatus of claim 18, wherein the multiple host interfaces comprise any combination of virtual interfaces and physical interfaces.

20. An apparatus comprising:
a plurality of ports;
a memory; and
a controller coupled to the ports and the memory, and configured to:
receive a data packet transmitted from a source host to a destination host,
place the data packet in a host buffer of the destination host,
generate a first completion queue event indicating that the data packet was placed in the host buffer, and
transmit, based on the first completion queue event, the data packet to a port mirroring destination.

21. The apparatus of claim 20, wherein the controller is configured to:
prevent the first completion queue event from reaching the destination host so that the host buffer remains temporarily locked to the destination host after receipt of the data packet;
generate a second completion queue event after transmission of the data packet to the port mirroring destination; and
forward the second completion queue event to the destination host so that the host buffer is unlocked to the destination host.

22. The apparatus of claim 21, wherein the memory comprises at least first and second completion queues, and wherein to forward the second completion queue event to the destination host the controller is configured to:
   add the second completion queue event to the second completion queue, wherein the second completion queue is monitored by a host driver of the destination host.

23. The apparatus of claim 20, wherein to place the data packet in the host buffer of the destination host the controller is configured to:
   perform a direct memory access operation to place the data packet in the host buffer.

24. The apparatus of claim 20, wherein the memory comprises a primary work queue and a secondary work queue, and wherein the controller is configured to:
   forward the first completion queue event to a secondary work queue; and
   perform a direct memory access operation to retrieve the data packet from the host buffer for use by the secondary work queue during transmission of the data packet to the port mirroring destination.

25. The apparatus of claim 20, wherein the apparatus operates with multiple host interfaces and the apparatus is configured to transmit data packets to a port mirroring destination for some or all of the multiple host interfaces.

26. The apparatus of claim 25, wherein the multiple host interfaces comprise any combination of virtual interfaces and physical interfaces.

27. One or more non-transitory computer readable storage media encoded with software comprising computer executable instructions and when the software is executed operable to:
   receive, at a network interface device of a first server, a notification from a source host on the first server indicating that a data packet is in a host buffer of the first server and that the data packet is ready for transmission to a destination host on a second server;
   transmit the data packet to the destination host;
   generate a first completion queue event indicating that the data packet was transmitted to the destination host; and
   transmit, based on the first completion queue event, the data packet to a port mirroring destination.

28. The non-transitory computer readable storage media of claim 27, further comprising instructions operable to:
   prevent the first completion queue event from reaching the source host so that the host buffer remains temporarily locked to the source host after transmission of the data packet to the destination host;
   generate a second completion queue event after transmission of the data packet to the port mirroring destination; and
   forward the second completion queue event to the source host so that the host buffer is unlocked to the source host.

29. The non-transitory computer readable storage media of claim 28, wherein the network interface device comprises at least first and second completion queues, and wherein the instructions operable to forward the second completion queue event to the source host comprise instructions operable to:
   add the second completion queue event to the second completion queue, wherein the second completion queue is monitored by a host driver of the source host.

30. The non-transitory computer readable storage media of claim 27, wherein the data packet is associated with a work queue descriptor, and wherein the instructions operable to transmit the data packet to the destination host comprise instructions operable to:
   perform, based on the work queue descriptor, a direct memory access operation to retrieve the data packet from the host buffer for use by a primary work queue during transmission of the data packet to the destination host.

31. The non-transitory computer readable storage media of claim 30, further comprising instructions operable to:
   forward the first completion queue event to a secondary work queue; and
   perform a direct memory access operation to re-retrieve the data packet from the host buffer for use by the secondary work queue during transmission of the data packet to the port mirroring destination.

* * * * *